United States Patent
Stephan et al.

(10) Patent No.: US 8,358,686 B2
(45) Date of Patent: Jan. 22, 2013

(54) VIDEO COMPRESSION SYSTEM

(75) Inventors: Martin Stephan, Ettlingen (DE); Ulrich Mohr, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1492 days.

(21) Appl. No.: 11/873,051

(22) Filed: Oct. 16, 2007

(65) Prior Publication Data

US 2008/0187047 A1    Aug. 7, 2008

(30) Foreign Application Priority Data

Oct. 17, 2006    (EP) ..................................... 06021719

(51) Int. Cl.
*H04N 7/12* (2006.01)
*H04N 11/02* (2006.01)
*H04N 11/04* (2006.01)

(52) U.S. Cl. ............................... 375/240.01; 375/240.16

(58) Field of Classification Search ........................ None
See application file for complete search history.

(56) References Cited

U.S. PATENT DOCUMENTS

| | | | | |
|---|---|---|---|---|
| 6,897,892 | B2* | 5/2005 | Kormos | 348/148 |
| 7,010,045 | B2* | 3/2006 | Lee | 375/240.25 |
| 2005/0213662 | A1* | 9/2005 | Owens et al. | 375/240.16 |
| 2006/0285596 | A1* | 12/2006 | Kondo et al. | 375/240.16 |
| 2007/0116119 | A1* | 5/2007 | Wang | 375/240.12 |
| 2007/0223825 | A1* | 9/2007 | Ye et al. | 382/240 |

FOREIGN PATENT DOCUMENTS

| | | |
|---|---|---|
| JP | 2001-103490 | 4/2001 |
| JP | 2004-056683 | 2/2004 |
| JP | 2004056578 | 2/2004 |
| JP | 2004-289305 | 10/2004 |
| JP | 2005-323021 | 11/2005 |

OTHER PUBLICATIONS

European Search Report No. 06021719 dated Jan. 11, 2007.

* cited by examiner

*Primary Examiner* — Nishant B Divecha
(74) *Attorney, Agent, or Firm* — Brooks Kushman P.C.

(57) ABSTRACT

A video compression system processes images captured from a video camera mounted to a vehicle. Vehicle-mounted sensors generate vehicle motion information corresponding to a current state of motion of the vehicle. An optical flow estimation circuit estimates apparent motion of objects within a visual field. A video encoder circuit in communication with the optical flow estimation circuit compresses the video data from the video camera based on the estimated apparent motion.

22 Claims, 8 Drawing Sheets

VIDEO COMPRESSION SYSTEM

BACKGROUND OF THE INVENTION

1. Priority Claim

This application claims the benefit of priority from European Patent Application No. 06 021719.7, filed Oct. 17, 2006, which is incorporated by reference.

2. Technical Field

This disclosure relates to video systems. In particular, this disclosure relates to video data compression systems.

3. Related Art

Vehicle video recording systems may require large amounts of storage. Video data may be compressed based on the differences from video frame to video frame in a pixel-oriented manner. However, such compression techniques may be computationally expensive and are not robust. These compression techniques may not faithfully predict frame-to-frame changes.

SUMMARY

A video compression system includes a video camera mounted to a vehicle, and vehicle-mounted sensors. The vehicle-mounted sensors generate vehicle motion information corresponding to a current state of motion of the vehicle. An optical flow estimation circuit generates an estimated motion of objects within a visual field of the video camera. A video encoder circuit in communication with the optical flow estimation circuit compresses the video data from the video camera in accordance with the estimated motion.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

Video data compression processes may reduce the bandwidth and amount of storage capacity required for transmitting and storing video data. Compression processes may be based on spatial redundancy and temporal redundancy. Spatial redundancy may relate to similarities between neighboring pixels, while temporal redundancy may relate to the similarities between consecutive frames. Spatial and temporal compression processes may reduce the amount of information saved and/or encoded. Statistical coding processes may convert data into a compressed data stream.

Figure 1:
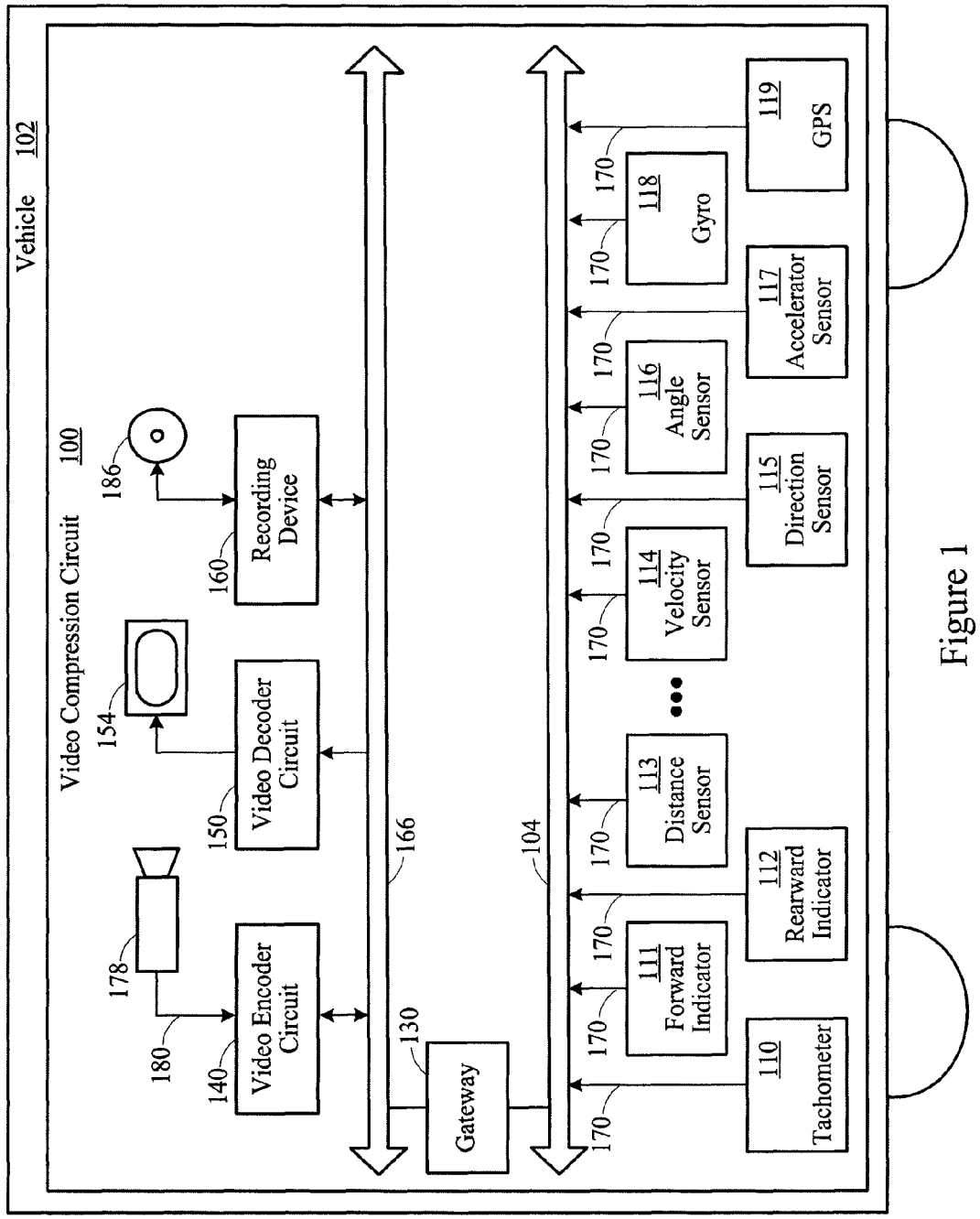
FIG. 1 is video compression system.

FIG. 1 is a video compression system 100. The video compression system 100 may be installed in a vehicle 102. The video compression system 100 may include a digital communication bus 104, such as a Controller Area Network (CAN) bus or a FlexRay™ bus. The digital communication bus 104 may connect a plurality of sensors 110-119 to a gateway 130.

The video compression system 100 may include multimedia components, such as a video encoder circuit 140, a video decoder circuit 150, a video display device 154, and a storage device 156. The video encoder circuit 140, the video decoder circuit 150, and the storage device 160 may communicate over a multimedia bus 166 according to a predetermined protocol, such as Media Oriented Systems Transport protocol or FireWire™ (IEEE1394) networking protocol. Other protocols may be used in alternative systems. Data may be transferred between the multimedia bus 166 and the digital communication bus 104 through the gateway 130. The gateway 130 may communicate with the multimedia bus 166 and the digital communication bus 104, which may utilize different formats and protocols, so that sensor data 170 may be delivered to the video encoder circuit 140 without the use of a wiring harness.

A video camera 178 may generate video data or transmit image data to the video encoder circuit 140. The video camera 178 may be mounted to the vehicle 102 or in the vehicle in a forward-facing direction to provide front view images for recording and/or displaying on the video display device 154. Front view images may be displayed to the user to create a record of events, whether the vehicle 102 is in motion or is stopped. Front view images may be useful for accident investigation or law enforcement.

The video camera 178 may be mounted to the vehicle 102 or in the vehicle in a rearward-facing direction to provide rear view images for recording and/or display. Rear view images may be displayed to the user to assist with parking and/or lane changes. Other cameras 178 may be mounted to or in the vehicle 102 and may face other directions. The video compression system 100 may compress and store the video data provided by the cameras 178. Alternatively, the video compression system 100 may directly transmit the images provided by the video camera 178 to the display device 154 unit without compression and/or storage.

The video encoder circuit 140 may receive a video signal 180 from the video camera 178 and compress the video signal. The video encoder circuit 140 may receive the sensor data 170 from the plurality of sensors 110-119 via the digital communication bus 104 and the gateway 130. The video encoder circuit 140 may output compressed video data to the multimedia bus 166 for transmission to the recording device 160 or the video decoder circuit 150. The video encoder circuit 140 may determine the vehicle's current state of motion from the data received from the sensors 110-119. The video encoder circuit 140 may process the signals or data received from the sensors 110-119 to increase the rate of motion vector processing.

The plurality of sensors 110-119 may be part of a control system that controls driveability while controlling emissions, or may be part of a supplemental restraint system, a navigation system, or a combination of in-vehicle sensors in the vehicle 102. The sensor may measure shaft rotation (e.g., such as a tachometer 110), may act as a forward direction indicator 111, a rearward direction indicator 112, a distance sensor 113, a velocity sensor 114, a direction sensor (compass) 115, and an angle sensor 116 coupled to the steering wheel. Some of the sensors may include equipment also available in the after-market, such as an accelerometer 117 (linear acceleration, radial acceleration), a gyroscope 118, and a GPS receiver 119.

The video decoder circuit 150 may receive compressed video data from the video encoder circuit 140 and/or the recording device 160 through the multimedia bus 166. The video decoder circuit 150 may decode the compressed video data and transmit the decoded video data to a user display device 154. The display device 154 may be an LCD display device or monitor, which may provide video images to the user.

The storage device 160 may receive compressed video data from the video encoder circuit 140 over the multimedia bus 166. The recording device 160 may record and store the data on a recording medium 186, such as magnetic tape, hard disk, or optical disc. The recording device 160 may retrieve the video data from the recording medium 186 and transmit the retrieved video data to the video decoder circuit 150 over the multimedia bus 166. The recording device 160 may be configured to store and retrieve prerecorded video data for entertainment purposes, such as movies from commercially available DVDs or wireless sources.

Figure 2:
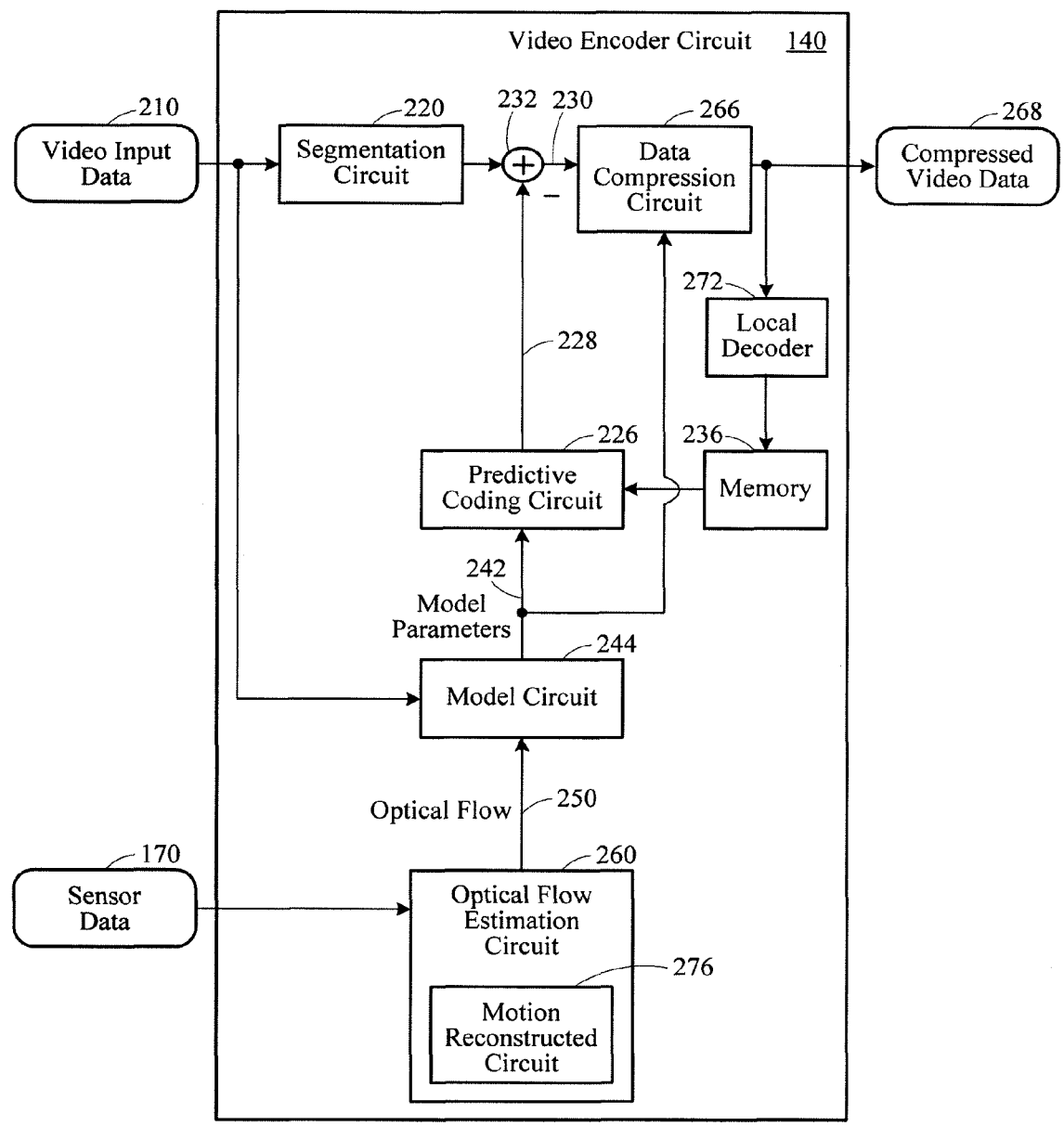
FIG. 2 is video encoder circuit.

FIG. 2 is the video encoder circuit 140. The video encoder circuit 140 may compress the video data in accordance with an MPEG standard (Motion Picture Experts Group), such as MPEG-2, MPEG-4, and H.264/AVC or other standards. This may allow compatibility with commercially available recording devices.

Video input data 210 for each video image or frame may be divided into a plurality of video blocks or video segments by a segmentation circuit 220. The video encoder circuit 140 may determine motion vectors for each of the video blocks or segments of a particular video image based on an estimated apparent motion and a location of the video block within the video image.

A predictive coding circuit 226 may generate predicted video images 228. A subtraction circuit 232 may subtract the predicted video images 228 from each of the segmented blocks of data to provide a prediction error 230. The predictive coding circuit 226 may predict a video block based on previously encoded video blocks stored in a memory 236, and based on model parameters 242 provided by a model circuit 244 or motion estimation circuit. The model parameters 242 provided by the model circuit 244 may represent an internal model of the image content. The model circuit 244 may receive the video input data 210, and may receive optical flow data 250 from an optical flow estimation circuit 260.

A data compression circuit 266 may receive the prediction error 230 and apply compression processes to generate compressed video data 268. The compression processes may include orthogonal transformation, quantization, and/or variable-length coding.

A local decoder 272 may receive the compressed video data 268 from the data compression circuit 266 and may "reverse" the operations performed by the data compression circuit and subtraction circuit 232 to provide a local "reference copy" of the image. The reference copy of the image may be reconstructed during processing. The model circuit 244 (motion estimation) may generate current or updated the model parameters 242 by comparing the model to the video input data 210 and by applying the estimated optical flow data 250 from the optical flow estimation circuit 260.

The optical flow estimation circuit 260 may include a motion reconstruction circuit 276 that reconstructs the vehicle's current state of motion based on the sensor data 170, and may generate the estimated optical flow data 250 on a block-by-block basis. The estimated optical flow data 250 may include motion vectors, which may characterize the current state of the vehicle motion, and may indicate the apparent motion of objects in the video input data 210. The optical flow estimation circuit 260 may determine the apparent motion of objects within the camera's visual field based on the vehicle's current state of motion and the relevant camera parameters.

The vehicle's current state of motion may be based on the sensor data 170, such as velocity, driving direction, linear acceleration, and radial acceleration. If the available sensor information does not fully reconstruct of the state of motion, velocity and driving direction may be derived, while other parameters may use default values. Based on the current state of motion of the vehicle 102, the optical flow within the camera's visual field may be estimated based on geometrical considerations, camera frame rate, and actual displacement of objects per frame.

Figure 3:
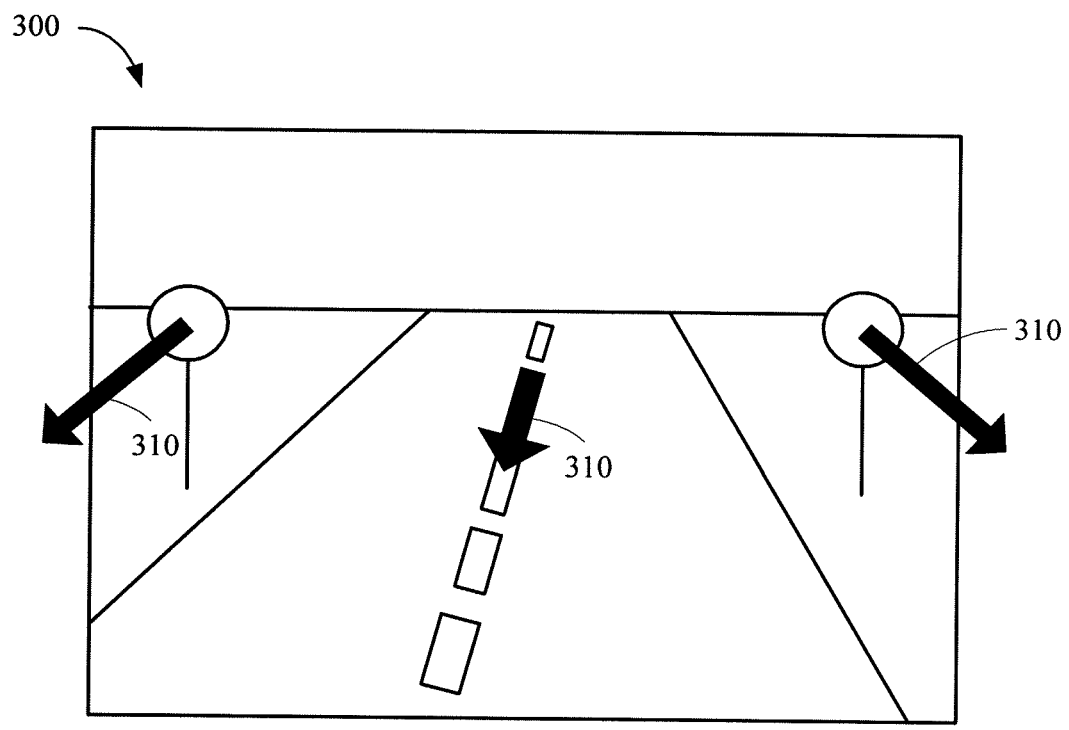
FIG. 3 is a camera image.

FIG. 3 is a captured camera image 300. The camera 178 may be mounted in a forward-facing direction, and may be directed to an area ahead of the vehicle 102. Objects in the left-hand portion of the image may appear to move toward the lower left-hand portion of the image, while objects in the right-hand portion of the image may appear to move toward the lower right-hand portion of the image, as indicated by the arrows 310.

Figure 4:
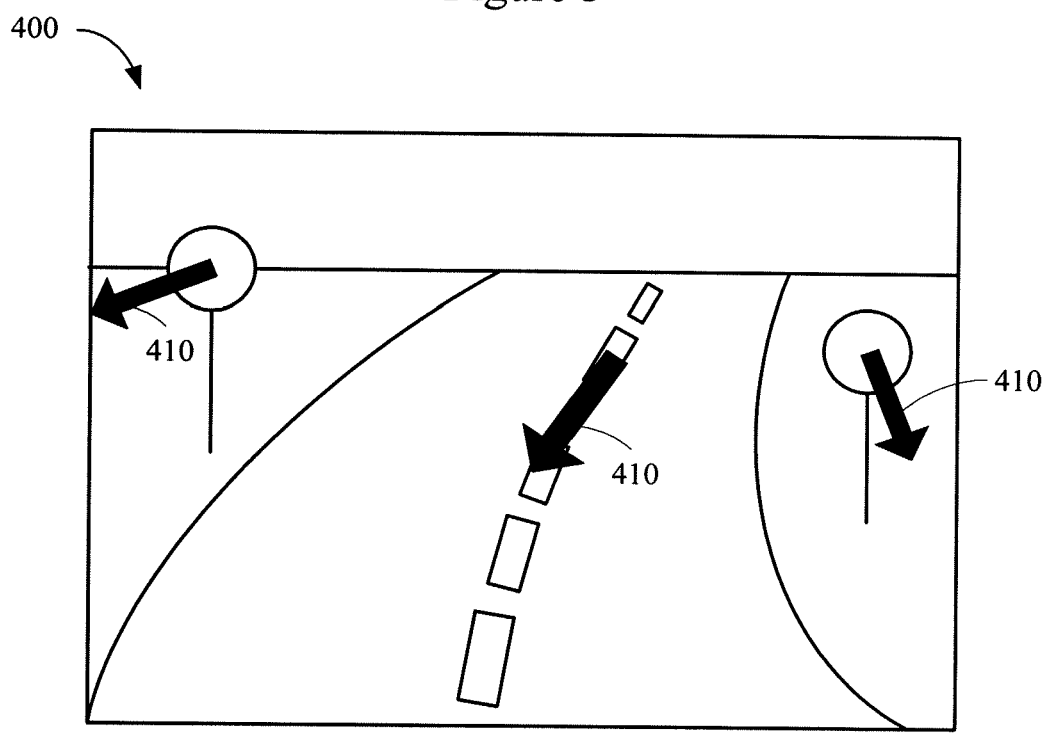
FIG. 4 is a camera image.

FIG. 4 is a captured camera image 400. The camera 178 may be mounted in a rearward-facing direction, and may be directed to the area behind the vehicle 102. The video images may be obtained while the vehicle 102 is following a right-hand curve. The apparent motion of objects in the captured images may be different than when the vehicle 102 is traveling in a straight line or a relatively straight line, as indicated by the arrows 410. In particular, the apparent motion of objects in the video images may depend on the vehicle speed, direction of travel, and the path of the vehicle travel. Other parameters, such as camera focal length and viewing direction of the camera may affect the determination of apparent motion. Such parameters may be fixed and may be known.

The optical flow estimation circuit 260 of FIG. 2 may generate the motion vectors by searching a predefined search range of possible motion vectors. This may permit adaptive processing of a search range of the motion vectors depending on encoding requirements and sensor data 170. In this manner, the video data 180 provided by the camera 178 may be compressed based on a motion estimation and compensation scheme, which may reduce computational requirements.

The optical flow estimation circuit 260 may establish the search range or the starting values for searching the motion vectors according to the estimated apparent motion. The motion vectors may be derived without searching the entire video image. The optical flow estimation circuit 260 may chose the starting value for determining the motion vectors by selecting the appropriate vector of the vector field for each block of the video image. The precision of the resulting motion vectors may be improved using an iterative process that converges to the motion vectors, which may provide an accurate description of the actual vehicle motion.

The model parameters 242 may be transmitted to the predictive coding circuit 226 to predict the video frames or images, and may be transmitted to the data compression circuit 266 for inclusion in the compressed video data 268. The predictive coding circuit 226 may predict video frames based on the model parameters 242, which may correspond to the motion vectors provided by the optical flow estimation circuit 260. This may reduce temporal correlation between consecutive video images.

The optical flow estimation circuit 260 may provide the optical flow information 250 for the estimated apparent motion in form of qualitative information, such as a type of flow field (zoom-in or zoom-out), leftward motion, or rightward motion. This information may be used to increase the data compression rate. The optical flow estimation circuit 260 may also provide optical flow information 250 for the estimated apparent motion in the form of a vector field representation. The motion (e.g. apparent motion) of objects may be described quantitatively using vector fields depending on the location of the object within the visual field of the camera. A starting value or search range for determining the motion vectors may be set even if the apparent motion of objects in one part of the visual field is different from objects in another part. For example, if the vehicle 102 is backing into a parking place at a velocity "v" of 1 meter per second, a stationary object within sight of the camera 178 may also move at velocity of 1 meter per second. If the camera's frame rate "f" is 25 images per second, then the object's displacement "s" for two consecutive video images may be determined as s=v/f=40 millimeters. Given the camera's viewing direction and focal length, the optical flow information, and thus the apparent motion of objects within the video images, may be derived.

The estimated apparent motion of objects within the visual field of the camera 178 may be derived even if information regarding the current state of motion is incomplete. For example, if the angular sensor 116 indicates a right-hand curve or turn, objects recorded by a forward-facing camera may appear to move to the left. If a sensor 112 attached to the gear shift indicates that the vehicle 102 is moving in reverse, objects recorded by the rearward-facing camera may appear to move towards the edge of the image (zoom in). Such qualitative information on the optical flow field may be used to increase the video compression rate.

Reconstruction of the optical flow may be based on sensor information that may be indirectly related to the vehicle's state of motion. Ultrasonic or radio-frequency based sensors (radar) 114 may measure the vehicle's velocity, for example, when backing into a parking space. Such sensors may measure relative velocities of oncoming vehicles. The information provided by these sensors, along with distance information, may be used to increase the accuracy of the estimated optical flow field by confirming assumptions on distance and motion of objects within the camera's visual field.

Figure 5:
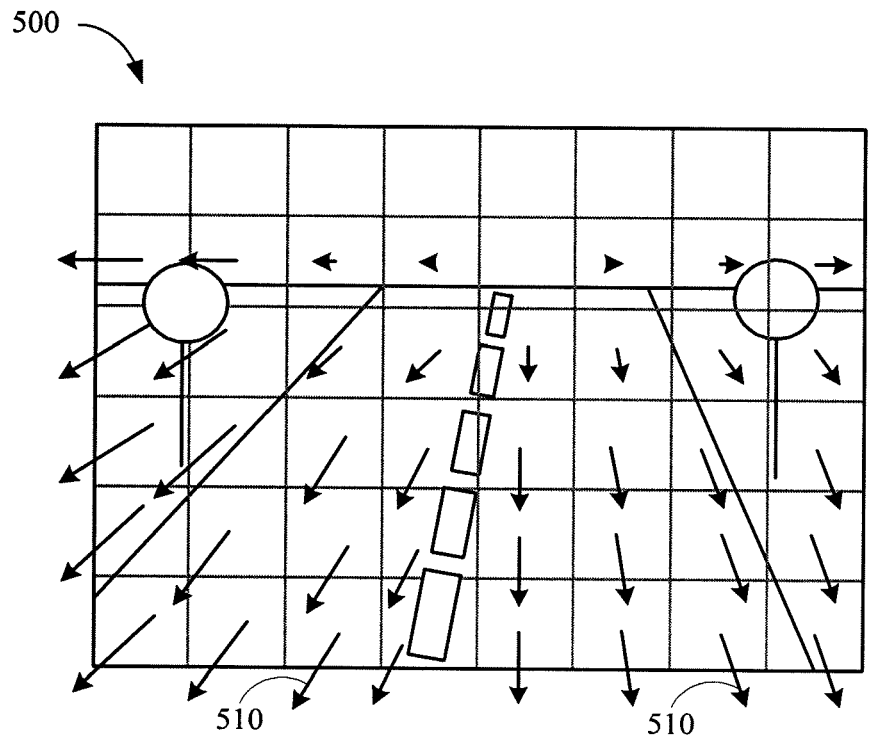
FIG. 5 is a vector representation.

FIG. 5 is an optical flow vector representation 500 for a block of data. Optical flow vectors 510 may describe the apparent motion of objects based on the vehicle's current state of motion. The optical flow vectors 510 may correspond to a vehicle 102 traveling in a straight line, and may represent the optical flow generated by the motion of the camera.

Figure 6:
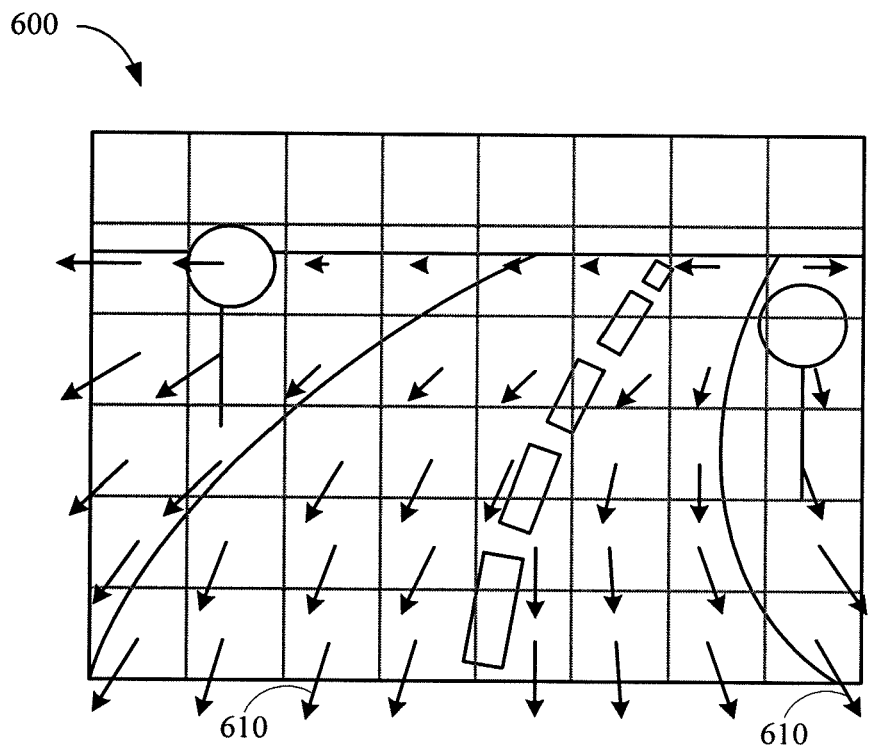
FIG. 6 is a vector representation.

FIG. 6 is an optical flow vector representation 600 for a block of data corresponding to a vehicle making a turn. Optical flow vectors 610 may correspond to a vehicle 102 executing a right-hand curve or turn.

Figure 7:
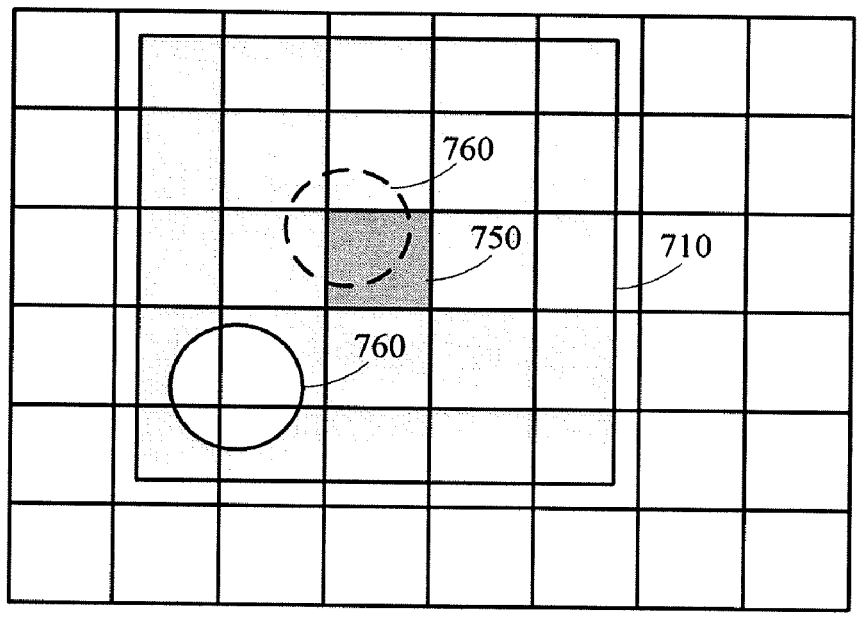
FIG. 7 is a motion vector process.

FIG. 7 represents motion vectors of a conventional process. The process may define a search range 710 centered around a current video block 750 of a previous video image. The process may search for a block translation that yields the best match with the current video image. Because a-priori information may not be available for the apparent motion of image objects 760, the search range is made sufficiently large so as to cover all possible movements of the object. Therefore, a large number of candidate translations may need to be evaluated, which may result in a large number of pixel difference computations.

Figure 8:
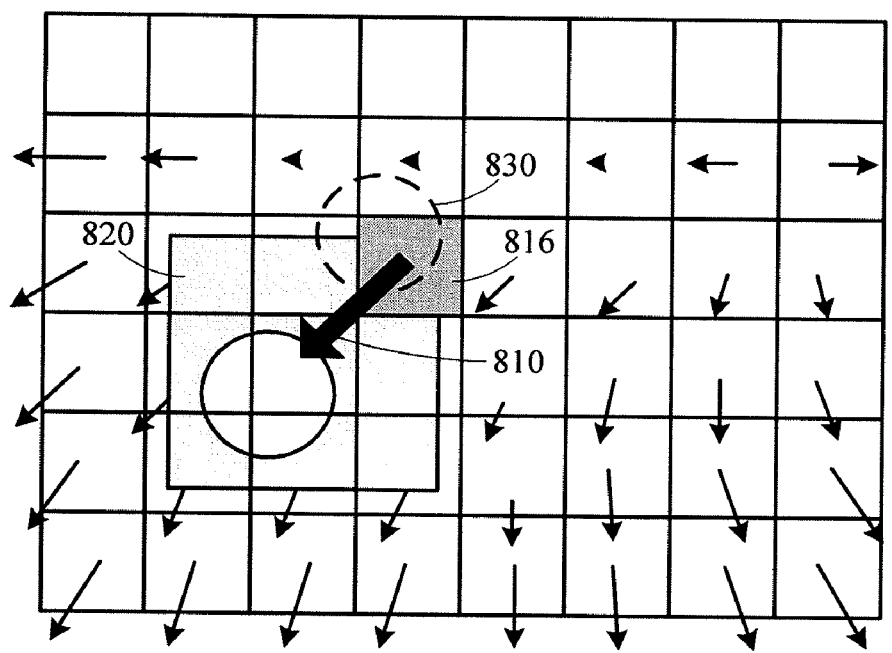
FIG. 8 is a motion vector process.

FIG. 8 represents motion vectors determined with the video compression system 100 of FIGS. 1-2. The optical flow estimation circuit 260 may estimate the optical flow field based on the sensor data 170. Based on the estimated optical flow vectors 810 corresponding to a current block of video data 816, the actual apparent motion of objects within the block of data may be estimated. A search range 820 may be defined based on the estimated apparent motion (estimated optical flow vectors 810). The actual apparent motion of an image object 830 may only slightly deviate from the estimate, and the search range may be centered around the estimate. Because the search range may be centered around the estimate 810, a relatively small number of candidate translations may be evaluated, and thus a relatively small number of pixel difference values may be computed. This may reduce computational requirements.

Alternatively, motion vectors may be determined using non-linear optimization processes, such as gradient based processes. An optimum translation may be found by computing a gradient of the sum of absolute pixel differences between the translated block of a previous video image and the current video image. The translation may be iteratively adjusted based on the computed gradient until the sum of the absolute pixel is minimized. For iterative processes, the accuracy of the final result and the speed of convergence may depend on the starting value. An accurate value may be based on the estimate of the apparent motion based the sensor data 170, which may reduce the number of processing iterations.

Iterative processing or searching may be avoided if predicted motion vectors are used directly. For example, the model circuit 244 (motion estimation) of FIG. 2 may calibrate the model (the motion vectors) by applying a process to every predetermined number of video images based on the video input data 210, and may update the model for the remaining video images based on the sensor data 170 only. This may reduce the computational load for determining the motion vectors. For example, if an acceleration sensor indicates that there is no change to the vehicle's state of motion, the set of motion vectors need not be updated to predict the next video image.

However, the set of motion vectors may be updated if the sensors indicate a change in the vehicle's state of motion. Linear acceleration or deceleration may translate into a scale factor applied to the motion vectors. Even if changes to the vehicle's state of motion are not completely known, the available information may be used to update motion vectors to improved starting points for iterative and/or search processes corresponding to the actual motion vectors.

Figure 9:
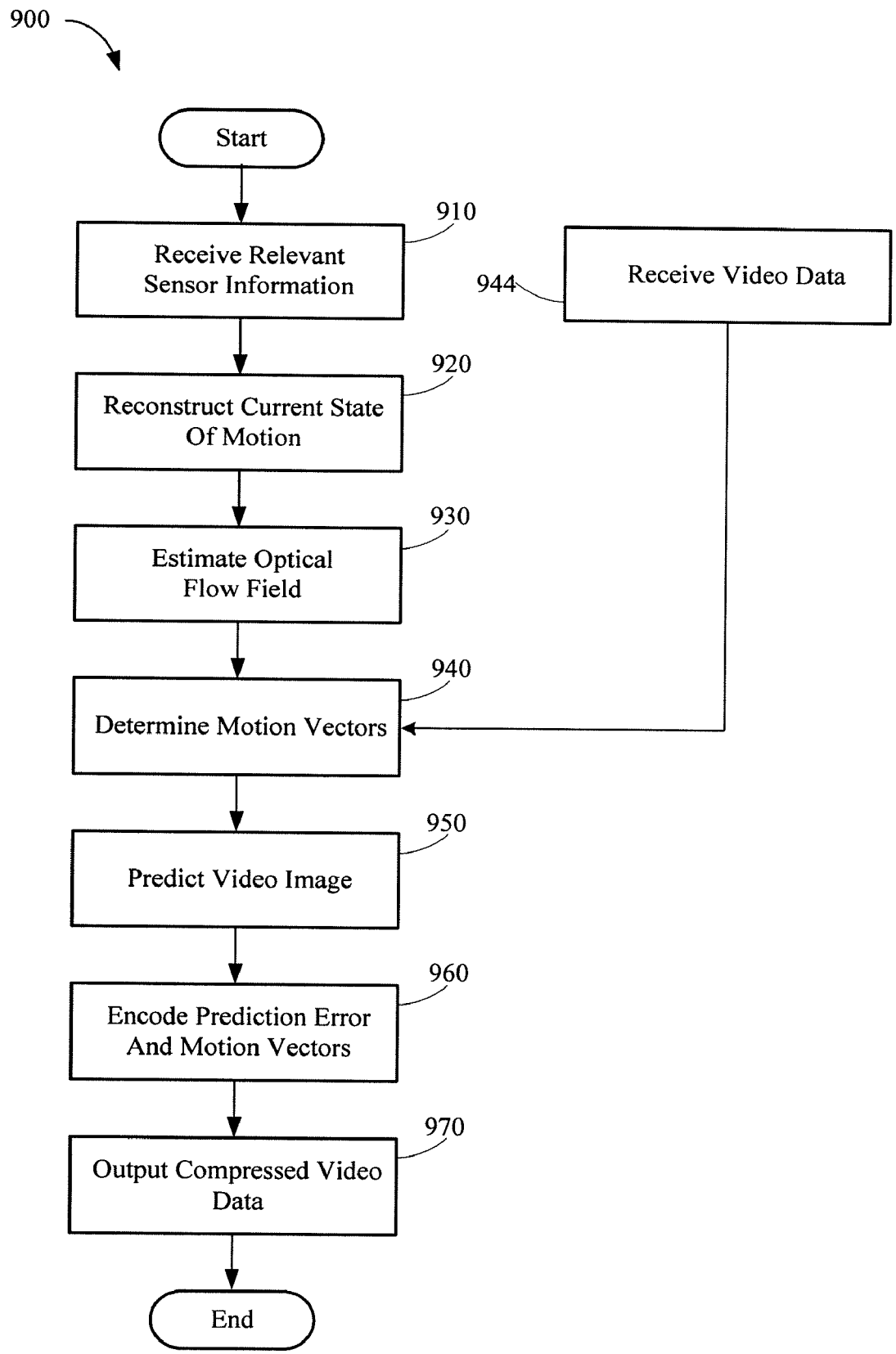
FIG. 9 is a compression process.

FIG. 9 is a compression process 900. The sensor information is received (Act 910). The sensor information may be used to reconstruct the vehicle's current state of motion (Act 920). Based on the information on the vehicle's actual motion and camera parameters, such as camera viewing direction, focal length, and frame rate, the optical flow field may be estimated (Act 930). The optical flow field may indicate the apparent motion of objects within the camera's visual field. This estimated optical flow field may be quantitative (vector field representation), or may be qualitative (type of the vector field).

The motion vectors may be determined (Act 940) using the estimated optical flow field. The motion vectors may be determined based on the received video data (Act 944). The estimated optical flow field may be used as a starting point for iteratively determining the motion vectors to define a restricted search range or to update previously determined motion vectors. A current video image may be predicted (Act 950) based on the motion vectors. The prediction errors and the motion vectors may then be encoded (Act 960), and compressed video data may be output (Act 970).

The video compression system 100 may not be limited to video encoding processes based on motion estimation and compensation. The video compression system 100 may use other processes for predicting video images, such as pattern recognition to recognize and track objects, such as other vehicles, road markings, traffic signs, and landmarks.

The logic, circuitry, and processing described above may be encoded in a computer-readable medium such as a CD/ROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

Figure 10:
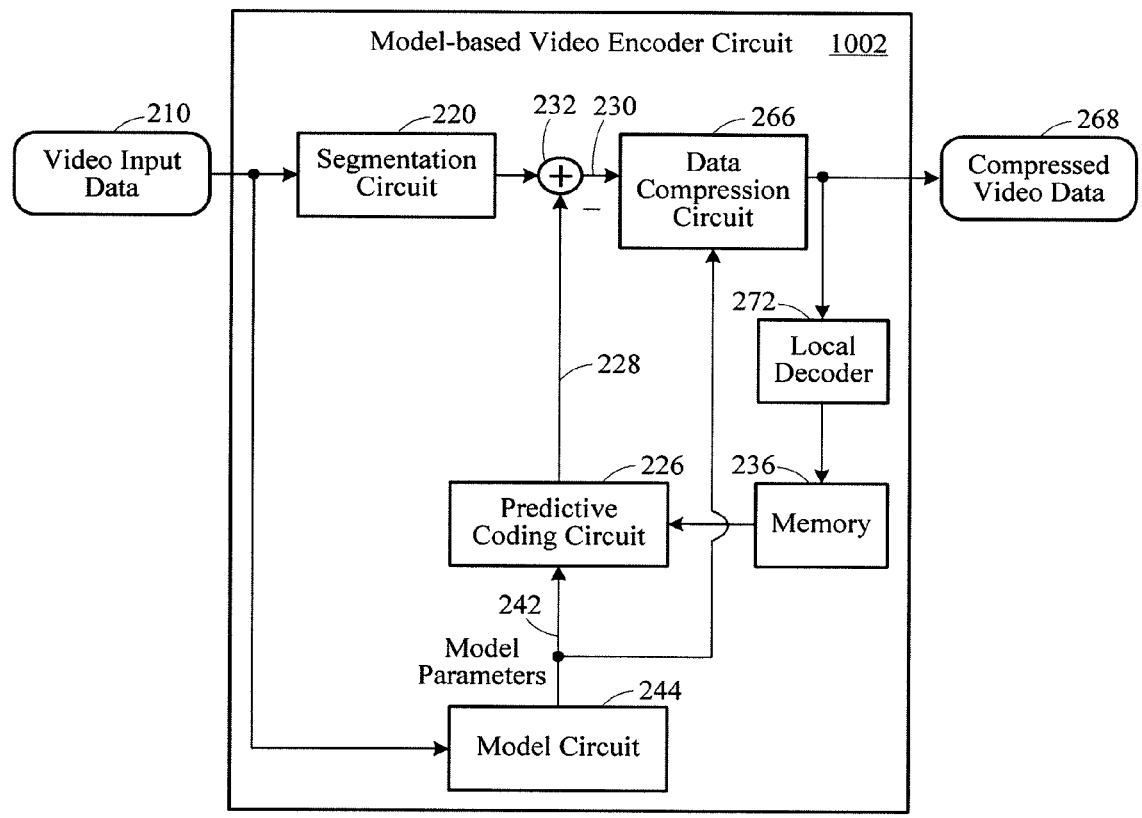
FIG. 10 is video compression system.

FIG. 10 is a model-based video encoder circuit 1002. The model-based video encoder circuit 1002 may be similar to the video encoder circuit 140 of FIG. 2, but may omit the optical flow estimation circuit 260 of FIG. 2. The model circuit 244 (motion estimation) may maintain a model of the video input data 210. The model generated by the model circuit 244 may be used by the predictive coding circuit 226 to generate the predicted video blocks 228. The model of the input data may not be static, and its parameters may be updated by the model circuit 244 based on the video input data 210. The model circuit 244 may provide the model parameters 242 to the data compression circuit 266 to be included into the compressed video data 268. This may permit the local decoder circuit 272 to decode compressed video data 268.

Figure 11:
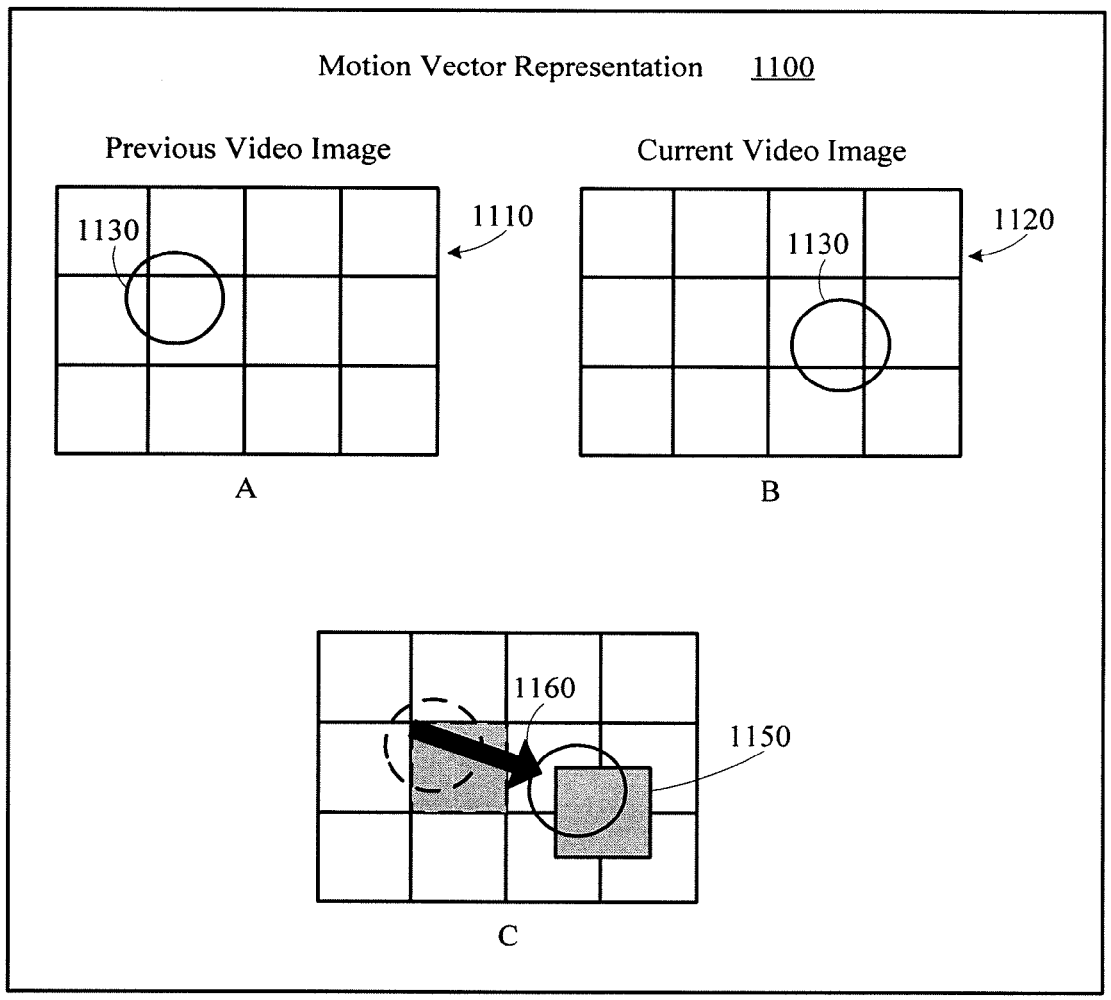
FIG. 11 is a motion vector determination representation.

FIG. 11 is a motion vector determination representation 1100. Panel A represents a previous video image 1110, and panel B represents a current video image 1120. An object 1130 in the current video image 1120 may have moved relative to its position in the previous video image 1110. To determine the corresponding motion vector, a block 1150 of the previous video image may be shifted and compared to the content of the current video image. The shifted position that yields the best match with the current video image may be used to define a motion vector 1160 for the data block.

The systems may include additional or different logic and may be implemented in many different ways. A processor or controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A video compression system comprising:
a video camera mounted to or in a vehicle, and configured to generate video data;
at least one sensor configured to generate vehicle motion information corresponding to a current state of motion of the vehicle;
an optical flow estimation circuit configured to generate an estimated apparent motion of objects within a visual field of the video camera, where the optical flow estimation circuit chooses a starting value for determining the motion vectors by selecting an appropriate vector of a vector field for each block of the video image associated with the current state of motion of the vehicle;
a video encoder circuit in communication with the optical flow estimation circuit, and configured to compress the video data in accordance with the estimated apparent motion of objects;
where the optical flow estimation circuit further comprises:
a motion reconstruction circuit configured to reconstruct the current state of motion of the vehicle, wherein the reconstruction is based on the vehicle motion information provided by the at least one sensor; and
wherein the estimated apparent motion of objects is determined in accordance with the reconstructed state of motion of the vehicle.

2. The system of claim 1, where the estimated apparent motion of objects includes qualitative information indicating a type of flow field.

3. The system of claim 1, where the estimated apparent motion of objects includes a vector field representation.

4. The system of claim 1, where the video encoder circuit comprises:
a model circuit configured to generate motion vectors indicating motion within the video data, the motion vectors determined based on the estimated apparent motion of objects; and
a predictive coding circuit configured generate predicted video data based on the motion vectors, and configured to determine differences between the video data and predicted video data.

5. The system of claim 4, where the model circuit generates the motion vectors by searching a predefined search range of possible motion vectors.

6. The system of claim 5, where the model circuit determines a search range based on the estimated apparent motion of objects.

7. The system of claim 5, where the model circuit determines a starting value for searching the motion vectors based on the estimated apparent motion of objects.

8. The system of claim 4, where the video encoder circuit comprises a segmentation circuit configured to partition video images into blocks, and where the model circuit determines motion vectors for each block based on the estimated apparent motion of objects and a location of the block within the video image.

9. The system of claim 1, where the video encoder circuit compresses the video data according to an MPEG (Motion Picture Experts Group) format.

10. The system of claim 1, where the at least one sensor comprises a tachometer, an accelerometer, an angular sensor, a distance sensor, a gyroscope, a compass, or a GPS receiver.

11. The system of claim 1, where the vehicle motion information includes velocity, direction of motion, linear acceleration, or radial acceleration.

12. The system of claim 1, further comprising a digital communication bus to facilitate communication between the sensors and the video encoder circuit.

13. The system of claim 12, comprising: a video decoder configured to decode the compressed video information; and a display device in communication with the decoder, where the display device is configured to display the decoded compressed video data.

14. The system of claim 12, comprising a recording device in communication with the video encoder circuit through the communication bus, where the recording device is configured to store the compressed video data.

15. A video compression system in or on a vehicle, comprising:
- a video camera mounted to or in the vehicle, the camera configured to generate video data;
- at least one sensor configured to generate vehicle motion information corresponding to a current state of motion of the vehicle;
- an optical flow estimation circuit configured to generate an estimated apparent motion of objects within a visual field of the video camera, where the optical flow estimation circuit chooses a starting value for determining the motion vectors by selecting an appropriate vector of a vector field for each block of the video image associated with the current state of motion of the vehicle;
- where the optical flow estimation circuit further comprises:
  - a motion reconstruction circuit configured to reconstruct the current state of motion of the vehicle, wherein the reconstruction is based on the vehicle motion information provided by the at least one sensor; and
  - wherein the estimated apparent motion of objects is determined in accordance with the reconstructed state of motion of the vehicle;
- a video encoder circuit in communication with the optical flow estimation circuit, and configured to compress the video data in accordance with the estimated apparent motion of objects; and
- the video encoder circuit further comprising:
- a model circuit configured to generate motion vectors indicating motion within the video data, the motion vectors determined based on the estimated apparent motion of objects; and
- a predictive coding circuit configured generate predicted video data based on the motion vectors, and configured to determine differences between the video data and predicted video data.

16. A method for compressing video data generated by a video camera mounted in or on a vehicle, the method comprising:
- generating, by the video camera, video data;
- generating, by at least one sensor, vehicle motion information corresponding to a current state of motion of the vehicle;
- estimating, by an optical flow estimation circuit, an apparent motion of objects within a visual field of the video camera, wherein the optical flow estimation circuit chooses a starting value for determining the motion vectors by selecting an appropriate vector of a vector field for each block of the video image associated with the current state of motion of the vehicle; and
- compressing, by a video encoder circuit, the video data in accordance with the estimated apparent motion of objects, wherein the video encoder circuit is communicating with the optical flow estimation circuit;
- reconstructing, by a motion reconstruction circuit of the optical flow estimation circuit, the current state of motion of the vehicle based on the sensor data;
- wherein estimating the apparent motion of objects is based on the reconstructed current state of motion of the vehicle.

17. The method of claim 16, where estimating the apparent motion of objects generates qualitative information indicating a type of flow field.

18. The method of claim 16, where estimating the apparent motion of objects generates vector field representation information.

19. The method of claim 16 comprising:
- determining motion vectors indicative of motion within a subsequent video image, the motion vectors determined based on the estimated apparent motion of objects within the visual field of the camera; and
- predictively coding differences between the video data and video images predicted from the motion vectors.

20. The method of claim 19, comprising determining the motion vectors by searching a predefined search range of possible motion vectors.

21. The method of claim 20, comprising determining the motion vectors by establishing a search range in accordance with the estimated apparent motion of objects.

22. The method of claim 20, comprising:
- segmenting a video image into a plurality of data blocks; and
- determining motion vectors for each block in accordance with the estimated apparent motion of objects and a location of the block within the video image.

* * * * *